UNITED STATES PATENT OFFICE.

GEORG STEINIKE AND FRIEDRICH SCHMIDT, OF HÖCHST-ON-THE-MAIN, GERMANY.

BLUE TRISAZO DYE.

SPECIFICATION forming part of Letters Patent No. 576,511, dated February 2, 1897.

Application filed January 11, 1895. Serial No. 534,573. (Specimens.) Patented in Germany August 24, 1894, No. 84,292.

*To all whom it may concern:*

Be it known that we, GEORG STEINIKE and FRIEDRICH SCHMIDT, citizens of the Empire of Germany, and residents of Höchst-on-the-Main, in the Empire of Germany, have invented certain new and useful Improvements in the Production of New Trisazo Coloring-Matter, (for which Letters Patent were granted by and with our consent in Germany to Meister, Lucius & Brüning, No. 84,292, dated August 24, 1894,) of which the following is a specification.

The dioxynaphthalenemonosulfonic acid S of the United States Letters Patent No. 444,679 is capable of combining with two molecules of one and the same diazo compound or with one molecule each of two different diazo compounds. By coupling the above-mentioned dioxynaphthalenemonosulfonic acid S with one molecule of a tetrazo compound instead of a second molecule of a diazo compound and by combining the substance thus obtained, which is capable of being again coupled with bases, phenols, naphthols, and their sulfonic or carbonic acids, we obtain new triazo coloring-matters possessing valuable properties. These coloring-matters dye wool and cotton and surpass the direct dyeing cotton-coloring matters at present in the market by their greater fastness to light and soap.

Those combinations whose second components possess a diazotizable amido group produce, on being further diazotized on the fiber, and on treatment with developers, such as phenol, resorcin, alpha and beta naphthol, metaphenylenediamin, chrysoidin, and amidonaphtholether, give shades ranging from violet to deep black, eminently fast to soap.

Example: One molecule of dioxynaphthalenemonosulfonate of sodium S and about three molecules of soda (or caustic alkali, ammonia, &c.) are dissolved in water, forming a solution of from ten to fifteen per cent. Then one molecule of diazonaphthionic acid is added at a low temperature and stirred for about six hours. Afterward about four molecules of soda (or caustic alkali, ammonia, &c.) dissolved in a small quantity of water are added, and then, at a temperature of 0° centigrade, one molecule of the tetrazo compound of benzidin. After standing for some time (from one to two hours) the formation of the intermediary product is completed, and it is then poured while stirring continuously into a solution of one molecule of amidonaphthol-disulfonic acid H and from two to three molecules of soda (or caustic alkali, ammonia, &c.) in a small quantity of water. Twelve hours later, when the formation of coloring-matter is finished, the coloring-matter is separated and purified in the usual manner.

Of course the operations can also be carried out in the following way: By first forming the monoazo coloring-matter, then combining one molecule of tetrazo benzidin with one molecule of amidonaphtholdisulfonic acid and causing this intermediate product to act upon the monoazo coloring-matter previously formed. The same coloring-matters can also be obtained by successively combining the tetrazo compound from one molecule of benzidin with one molecule of dioxynaphthalenemonosulfonic acid S, and then with one molecule of amidonaphtholdisulfonic acid H, and finally by treating an alkaline solution of the coloring-matter already formed with one molecule of diazonaphthionic acid.

In place of the benzidin in the example an equivalent quantity of tolidin, dianisidin, diphenetidin, &c., may be substituted; in place of the naphthionic acid any other diazotizable and combining substance, and in place of the amidonaphtholdisulfonic acid H any other amido acid, amin, phenol, naphthol, their sulfonic or carbonic acids, &c., as indicated by the following combinations:

Benzidin + {Dioxynaphthalenemonosulfonic acid S—alpha-naphthylamin (diazotized) / Amidonaphtholmonosulfonic acid G.

Benzidin + {Dioxynaphthalenemonosulfonic acid S—alpha-naphthylamin (diazotized) / Salicylic acid.

Diphenetidin + {Dioxynaphthalenemonosulfonic acid S—alpha-naphthylamin (diazotized) / Amidonaphtholmonosulfonic acid G.

| | |
|---|---|
| Benzidin | + { Dioxynaphthalenemonosulfonic acid S—alpha-naphthylamin (diazotized) / Alpha-naphthylamin. |
| Benzidin | + { Dioxynaphthalenemonosulfonic acid S—anilin (diazotized) / Amidonaphtholmonosulfonic acid G. |
| Benzidin | + { Dioxynaphthalenemonosulfonic acid S—anilin (diazotized) / Beta-naphtholmonosulfonic acid F 2.7. |
| Benzidin | + { Dioxynaphthalenemonosulfonic acid S—orthotoluidin (diazotized) / Amidonaphtholmonosulfonic acid G. |
| Benzidin | + { Dioxynaphthalenemonosulfonic acid S—orthotoluidin (diazotized) / Alpha-naphtholmonosulfonic acid, (Neville-Winther.) |
| Benzidin | + { Dioxynaphthalenemonosulfonic acid S—paranitranilin (diazotized) / [Dioxynaphthalenemonosulfonic acid S—paranitranilin (diazotized)] |
| Benzidin | + { [Dioxynaphthalenemonosulfonic acid S—naphthionic acid (diazotized)] / Amidonaphtholdisulfonic acid H. |
| Benzidin | + { [Dioxynaphthalenemonosulfonic acid S—naphthionic acid (diazotized)] / Amidonaphtholmonosulfonic acid G. |
| Benzidin | + { [Dioxynaphthalenemonosulfonic acid S—naphthionic acid (diazotized)] / Naphthionic acid. |
| Benzidin | + { [Dioxynaphthalenemonosulfonic acid S—naphthionic acid (diazotized)] / Naphtholtrisulfonic acid of German Patent No. 56,058. |
| Benzidin | + { [Dioxynaphthalenemonosulfonic acid S—naphthionic acid (diazotized)] / Salicylic acid. |
| Benzidin | + { [Dioxynaphthalenemonosulfonic acid S—naphthionic acid (diazotized)] / Alpha-naphtholmonosulfonic acid, (Neville-Winther.) |
| Tolidin | + { [Dioxynaphthalenemonosulfonic acid S—naphthionic acid (diazotized)] / Amidonaphtholdisulfonic acid H. |
| Dianisidin | + { [Dioxynaphthalenemonosulfonic acid S—naphthionic acid (diazotized)] / Amidonaphtholdisulfonic acid H. |
| Diphenetidin | + { [Dioxynaphthalenemonosulfonic acid S—naphthionic acid (diazotized)] / Amidonaphtholdisulfonic acid H. |
| Tolidin | + { [Dioxynaphthalenemonosulfonic acid S—naphthionic acid (diazotized)] / Naphtholtrisulfonic acid of German Patent No. 56,058. |
| Dianisidin | + { [Dioxynaphthalenemonosulfonic acid S—naphthionic acid (diazotized)] / Naphtholtrisulfonic acid of German Patent No. 56,058. |
| Diphenetidin | + { [Dioxynaphthalenemonosulfonic acid S—naphthionic acid (diazotized)] / Naphtholtrisulfonic acid of German Patent No. 56,058. |
| Tolidin | + { [Dioxynaphthalenemonosulfonic acid S—naphthionic acid (diazotized)] / Naphthionic acid. |
| Dianisidin | + { [Dioxynaphthalenemonosulfonic acid S—naphthionic acid (diazotized)] / Naphthionic acid. |
| Diphenetidin | + { [Dioxynaphthalenemonosulfonic acid S—naphthionic acid (diazotized)] / Naphthionic acid. |
| M-mononitrobenzidin | + { [Dioxynaphthalenemonosulfonic acid S—naphthionic acid (diazotized)] / Naphthionic acid. |
| Tolidin | + { [Dioxynaphthalenemonosulfonic acid S—naphthionic acid (diazotized)] / Amidonaphtholmonosulfonic acid G. |
| Dianisidin | + { [Dioxynaphthalenemonosulfonic acid S—naphthionic acid (diazotized)] / Amidonaphtholmonosulfonic acid G. |
| Diphenetidin | + { [Dioxynaphthalenemonosulfonic acid S—naphthionic acid (diazotized)] / Amidonaphtholmonosulfonic acid G. |
| M-mononitrobenzidin | + { [Dioxynaphthalenemonosulfonic acid S—naphthionic acid (diazotized)] / Amidonaphtholmonosulfonic acid G. |
| M-mononitrobenzidin | + { [Dioxynaphthalenemonosulfonic acid S—naphthionic acid (diazotized)] / Amidonaphtholdisulfonic acid H. |

| First component | Second component |
|---|---|
| M-mononitrobenzidin | + {[Dioxynaphthalenemonosulfonic acid S—naphthionic acid (diazotized)] / Naphtholtrisulfonic acid of German Patent No. 56,058.} |
| Benzidin | + {[Dioxynaphthalenemonosulfonic acid S—orthoamido-salicylic acid (diazotized)] / Alpha-naphtholmonosulfonic acid, (Neville-Winther.)} |
| Benzidin | + {[Dioxynaphthalenemonosulfonic acid S—paraämido-salicylic acid (diazotized)] / Alpha-naphtholmonosulfonic acid, (Neville-Winther.)} |
| Benzidin | + {[Dioxynaphthalenemonosulfonic acid S—naphthionic acid (diazotized)] / Amidonaphtholdisulfonic acid of German Patent No. 53,023.} |
| Tolidin | + {[Dioxynaphthalenemonosulfonic acid S—naphthionic acid (diazotized)] / Salicylic acid.} |
| Tolidin | + {[Dioxynaphthalenemonosulfonic acid S—naphthionic acid (diazotized)] / Amidonaphtholdisulfonic acid of German Patent No. 53,023.} |
| Dianisidin | + {[Dioxynaphthalenemonosulfonic acid S—naphthionic acid (diazotized)] / Salicylic acid.} |
| Dianisidin | + {[Dioxynaphthalenemonosulfonic acid S—naphthionic acid (diazotized)] / Amidonaphtholdisulfonic acid of German Patent No. 53,023.} |
| Diphenetidin | + {[Dioxynaphthalenemonosulfonic acid S—naphthionic acid (diazotized)] / Salicylic acid.} |
| Diphenetidin | + {[Dioxynaphthalenemonosulfonic acid S—naphthionic acid (diazotized)] / Amidonaphtholdisulfonic acid of German Patent No. 53,023.} |
| Benzidin | + {[Dioxynaphthalenemonosulfonic acid S—paranitranilin (diazotized)] reduced, / Salicylic acid.} |
| Benzidin | + {[Dioxynaphthalenemonosulfonic acid S—paranitranilin (diazotized)] reduced, / Naphthionic acid.} |
| Benzidin | + {[Dioxynaphthalenemonosulfonic acid S—paranitranilin (diazotized)] reduced, / Amidonaphtholmonosulfonic acid G.} |
| Benzidin | + {[Dioxynaphthalenemonosulfonic acid S—paranitranilin (diazotized)] reduced, / Amidonaphtholdisulfonic acid of German Patent No. 53,023.} |
| Benzidin | + {[Dioxynaphthalenemonosulfonic acid S—paranitranilin (diazotized)] reduced, / Amidonaphtholdisulfonic acid H.} |
| Tolidin | + {[Dioxynaphthalenemonosulfonic acid S—paranitranilin (diazotized)] reduced, / Salicylic acid.} |
| Tolidin | + {[Dioxynaphthalenemonosulfonic acid S—paranitranilin (diazotized)] reduced, / Naphthionic acid.} |
| Tolidin | + {[Dioxynaphthalenemonosulfonic acid S—paranitranilin (diazotized)] reduced, / Amidonaphtholmonosulfonic acid G.} |
| Tolidin | + {[Dioxynaphthalenemonosulfonic acid S—paranitranilin (diazotized)] reduced, / Amidonaphtholdisulfonic acid of the German Patent No. 52,023.} |
| Tolidin | + {[Dioxynaphthalenemonosulfonic acid S—paranitranilin (diazotized)] reduced, / Amidonaphtholdisulfonic acid H.} |
| Dianisidin | + {[Dioxynaphthalenemonosulfonic acid S—paranitranilin (diazotized)] reduced, / Salicylic acid.} |
| Dianisidin | + {[Dioxynaphthalenemonosulfonic acid S—paranitranilin (diazotized)] reduced, / Naphthionic acid.} |
| Dianisidin | + {[Dioxynaphthalenemonosulfonic acid S—paranitranilin (diazotized)] reduced, / Amidonaphtholmonosulfonic acid G.} |
| Dianisidin | + {[Dioxynaphthalenemonosulfonic acid S—paranitranilin (diazotized)] reduced, / Amidonaphtholdisulfonic acid of German Patent No. 53,023.} |
| Dianisidin | + {[Dioxynaphthalenemonosulfonic acid S—paranitranilin (diazotized)] reduced, / Amidonaphtholdisulfonic acid H.} |
| Diphenetidin | + {[Dioxynaphthalenemonosulfonic acid S—paranitranilin (diazotized)] reduced, / Salicylic acid.} |
| Diphenetidin | + {[Dioxynaphthalenemonosulfonic acid S—paranitranilin (diazotized)] reduced, / Naphthionic acid.} |

| | |
|---|---|
| Diphenetidin | + { [Dioxynaphthalenemonosulfonic acid S—paranitranilin (diazotized)] reduced, <br> Amidonaphtholmonosulfonic acid G. |
| Diphenetidin | + { [Dioxynaphthalenemonosulfonic acid S—paranitranilin (diazotized)] reduced, <br> Amidonaphtholdisulfonic acid of German Patent No. 53,023. |
| Diphenetidin | + { [Dioxynaphthalenemonosulfonic acid S—paranitranilin (diazotized)] reduced, <br> Amidonaphtholdisulfonic acid H. |
| Benzidin | + { [Dioxynaphthalenemonosulfonic acid S—sulfanilic acid (diazotized)] <br> Salicylic acid. |
| Benzidin | + { [Dioxynaphthalenemonosulfonic acid S—sulfanilic acid (diazotized)] <br> Naphthionic acid. |
| Benzidin | + { [Dioxynaphthalenemonosulfonic acid S—sulfanilic acid (diazotized)] <br> Amidonaphtholmonosulfonic acid G. |
| Benzidin | + { [Dioxynaphthalenemonosulfonic acid S—sulfanilic acid (diazotized)] <br> Amidonaphtholdisulfonic acid of German Patent No. 53,023. |
| Benzidin | + { [Dioxynaphthalenemonosulfonic acid S—sulfanilic acid (diazotized)] <br> Amidonaphtholdisulfonic acid H. |
| Tolidin | + { [Dioxynaphthalenemonosulfonic acid S—sulfanilic acid (diazotized)] <br> Salicylic acid. |
| Tolidin | + { [Dioxynaphthalenemonosulfonic acid S—sulfanilic acid (diazotized)] <br> Naphthionic acid. |
| Tolidin | + { [Dioxynaphthalenemonosulfonic acid S—sulfanilic acid (diazotized)] <br> Amidonaphtholmonosulfonic acid G. |
| Tolidin | + { [Dioxynaphthalenemonosulfonic acid S—sulfanilic acid (diazotized)] <br> Amidonaphtholdisulfonic acid of German Patent No. 53,023. |
| Tolidin | + { [Dioxynaphthalenemonosulfonic acid S—sulfanilic acid (diazotized)] <br> Amidonaphtholdisulfonic acid H. |
| Dianisidin | + { [Dioxynaphthalenemonosulfonic acid S—sulfanilic acid (diazotized)] <br> Salicylic acid. |
| Dianisidin | + { [Dioxynaphthalenemonosulfonic acid S—sulfanilic acid (diazotized)] <br> Naphthionic acid. |
| Dianisidin | + { [Dioxynaphthalenemonosulfonic acid S—sulfanilic acid (diazotized)] <br> Amidonaphtholmonosulfonic acid G. |
| Dianisidin | + { [Dioxynaphthalenemonosulfonic acid S—sulfanilic acid (diazotized)] <br> Amidonaphtholdisulfonic acid of German Patent No. 53,023. |
| Dianisidin | + { [Dioxynaphthalenemonosulfonic acid S—sulfanilic acid (diazotized)] <br> Amidonaphtholmonosulfonic acid H. |
| Diphenetidin | + { [Dioxynaphthalenemonosulfonic acid S—sulfanilic acid (diazotized)] <br> Salicylic acid. |
| Diphenetidin | + { [Dioxynaphthalenemonosulfonic acid S—sulfanilic acid (diazotized)] <br> Naphthionic acid. |
| Diphenetidin | + { [Dioxynaphthalenemonosulfonic acid S—sulfanilic acid (diazotized)] <br> Amidonaphtholmonosulfonic acid G. |
| Diphenetidin | + { [Dioxynaphthalenemonosulfonic acid S—sulfanilic acid (diazotized)] <br> Amidonaphtholdisulfonic acid of German Patent No. 53,023. |
| Diphenetidin | + { [Dioxynaphthalenemonosulfonic acid S—sulfanilic acid (diazotized)] <br> Amidonaphtholdisulfonic acid H. |

What we claim as new, and desire to secure by Letters Patent, is—

1. The process herein discovered of producing mixed trisazo coloring-matters which consists in combining one molecule of dioxynaphthalenemonosulfonic acid S with one molecule of a diazo compound and coupling the monoazo coloring-matter thus formed with one molecule of a tetrazo compound, and then coupling the resulting intermediate product with a further molecule of a phenol, naphthol, their carbonic or sulfonic acids, substantially as described.

2. As a new article of manufacture, a coloring-matter, which is obtained by combining dioxynaphthalenemonosulfonic acid S with a diazo compound, next with a tetrazo compound, and then with a phenol, naphthol or their derivatives, and which consists of a gray-black powder, dissolving in water with violet-blue color, soluble in concentrated sulfuric acid with blue color, giving a violet precipitate on addition of water, and dyeing cotton blue tints.

In testimony that we claim the foregoing as our invention we have signed our names in presence of two subscribing witnesses.

GEORG STEINIKE.
FRIEDRICH SCHMIDT.

Witnesses:
HEINRICH HAHN,
JOHANN HARTENSTEIN.